3,005,805
RUBBER WITH A CYCLIC TRIENE THEREIN

Leon Sherwood Minckler, Jr., Metuchen, Augustus B. Small, Westfield, Clifford W. Muessig, Roselle, and Samuel B. Lippincott, Springfield, N.J., assignors to Esso Research and Engineering Company, a corporation of Delaware
No Drawing. Filed May 29, 1959, Ser. No. 816,731
2 Claims. (Cl. 260—79.5)

This invention relates to a method for increasing the ozone resistance of a rubbery polymer and more particularly to the improved vulcanizate therefrom.

It is known that deterioration of natural and/or synthetic rubber is caused by ozone attacking the double bonds which are found in the rubbery chain. Although this nefarious ozone is present in the air in relatively low concentrations, it still has a deleterious effect upon rubbery polymers, such as cracking in a tire casing under tension. This cracking is obviously undesirable from a commercial standpoint.

Several methods have been used in the past to improve the resistance to ozone in a rubbery polymer. The first method is to incorporate a wax therein, but this has a definite disadvantage; the wax coating also cracks and therefore the rubber will still be attacked by the ozone. A second method is to add secondary aromatic amines or secondary aromatic phenols; however, these compounds will stain and/or corrode other materials contacted by the rubber, such as the painted surface of a vehicle.

It has now been discovered that the ozone resistance of rubbery polymers can be substantially increased by incorporating a cyclic triene therein. This method overcomes the serious disadvantages which were previously encountered in the utilization of the aforementioned waxes and/or secondary aromatic amines and phenols. One embodiment of this invention, therefore, is to provide an unsaturated rubbery polymer such as butyl rubber. This polymer is then compounded with 0.1 to 20.0 parts of a cyclic triene, e.g., 1,5,9-cyclododecatriene. The compounded rubber is subsequently cured to provide a hard vulcanizate therefrom.

The rubbery compounds to which this invention is applicable are any unsaturated rubber such as butyl rubber, natural rubber, neoprene, SBR (the copolymer of major amounts of butadiene and minor amounts of styrene), and ABR (the copolymer of butadiene and acrylonitrile). Butyl rubber is preferred. It has excellent ozone resistance initially because of the low unsaturation which it possesses (iodine number less than 50, generally about 1 to 10). However, through the utilization of this invention, it is possible to increase the ozone resistance in butyl rubber to an even greater extent.

The butyl rubber polymer is prepared by reacting 70 to 99.5 parts by weight, preferably 85 to 99.5, of an isoolefin with 30 to 0.5 parts by weight, preferably 15 to 0.5, of multiolefin. The isoolefin, in general, is a $C_4$ to $C_7$ compound, e.g., isobutylene or 2-methyl-1-butene. The multiolefin, in general, is a $C_4$ to $C_{10}$ conjugated diolefin, e.g., isoprene, butadiene, or piperylene. The preferred polymer is obtained by reacting 95 to 99.5% by weight of isobutylene with 0.5 to 5% by weight of isoprene. Mixture of monomers, preferably with 1 to 5 volumes of inert diluent, e.g., methyl chloride, should be cooled to a temperature between 0 and $-200°$ C. and it is preferred that the temperature range be between $-60°$ and $-130°$ C. The cold mixture is polymerized by the addition of a Friedel-Crafts catalyst, preferably an aluminum halide catalyst in a liquid or dissolved form, in conjunction with vigorous agitation. The amount of catalyst is generally about 0.15 to 1.0% by weight of the mixed olefins. The polymerization reaction is rapid and the polymer precipitates out of the solution in the form of a slurry or flocculent white solid. The polymer, which is recovered and dried, has a Staudinger molecular weight between 20,000 and 150,000, preferably 45,000 to 60,000; and an iodine number between 0.5 and 50, preferably between 1 and 15. The preparation of this copolymer is described in U.S. Patent No. 2,356,128.

The butyl rubber, similarly to other rubbers, can be compounded with various other materials. Some examples of the types of materials that can be incorporated are as follows: stabilizers, plasticizers, fillers, accelerators, softeners, catalysts, and cross-linking agents. Compounding may be accomplished by subjecting the rubber to a severe mixing treatment in a Banbury Mill at a temperature range of 75° F. to 500° F. This drastic treatment homogenizes the polymer and removes foci of impurities. Some compounding ingredients may be added during the working in this mill. The treated polymer can then be worked on an open-roll mill with the addition of other compounding ingredients. A halogenated derivative of butyl rubber, e.g., chlorinated or brominated butyl rubber is within the purview of this invention. The preferred range of halogen in the rubber structure is from 0.9 to 1.5 weight percent for chlorinated butyl rubber and 1.5 to 3.0 weight percent for brominated butyl rubber.

In accordance with this invention, a cyclic triene hydrocarbon is compounded with the rubbery polymer. The cyclic trienes within the purview of this invention are those which have between 7 and 20 carbon atoms such as 1,5,9-cyclododecatriene, cycloheptatriene, and bicyclooctatriene. The preferred compound is 1,5,9-cyclododecatriene which can be prepared from butadiene which is trimerized in the presence of an titanium ester-aluminum triethyl catalyst (Angewandte Chemie, v. 69, No. 11:397 (6/7/57); Snytheses in the Cyclodecane Series, G. Wilke, Mulheim (Ruhr); (Nordwestdeutsche Chemie-dozenten Meeting, Munster, April 1–3, 1957)). The end product has a pour point of $-18°$ C. and a boiling point of 100–101° C. The cyclic triene is generally added in amounts ranging from 0.1 to 20.0 parts, preferably 0.2 to 5.0 parts, per 100 parts by weight of rubber (phr.). As more triene is used, more sulfur and accelerator must be used to obtain a cure.

In accordance with this invention the cyclic trienes are preferred. However other cyclic materials may be used advantageously such as, cyclooctatetrene, bicyclohepta-diene, norbornylene, cyclohexadiene, cycloheptadiene, cyclooctadiene, depentene and certain other terpenes.

The 1,5,9-cyclododecatriene may be added to the rubber in any one of three methods or in any combination of these three methods. The first method is to add the cyclododecatriene as a compounding agent before the curing operation. This compound may be added to the polymer by Banbury mixing and/or mill mixing. A second method for the addition of cyclododecatriene is after the curing step. In this method, the cured rubber is immersed in cyclododecatriene or an aqueous emulsion thereof. After a period of time the vulcanizate swells, which indicates that the cyclododecatriene has been absorbed in the rubber. After immersion, the rubber is allowed to dry and contract to its former shape. The immersing solution heretofore described may contain 5 to 100% cyclododecatriene and 95 to 0% water. The time will generally fall within the range of 1 minute to 3 hours, depending on temperature and pressure. A temperature below 170° C. may be used, but room temperature is satisfactory. Pressure above atmosphere may be utilized in order to accelerate the process but will fall within the range of 1 to 10 atmospheres. Any known procedure can be used to dry the immersed rubber. The preferred procedure is air drying at a range of 60° to 350° F. for about 1 to 16 hours. The cyclododecatriene can also be added by a third method which is somewhat e.g., <120° F. The compounded polymers were then cured in molds at a temperature of 307° F. for 40 min-

*The increase in ozone resistance of rubber vulcanizates [1] obtained by the use of 1,5,9-cyclododecatriene*

| Vulcanizate | Rubber | Cyclic Triene (phr.) | Sulfur (phr.) | Tuads (phr.) | 300% Modulus (p.s.i.) | Tensile Strength (p.s.i.) | Elongation, percent | Ozone, percent | Crack (min. to—) | Break (min. to—) |
|---|---|---|---|---|---|---|---|---|---|---|
| C | (a) | 1 | 1 | 1.2 | 190 | 1,850 | 960 | 0.2 | 128 | >240 |
| D | (b) | 1 | 1 | 1.2 | 370 | 2,920 | 805 | 0.2 | 45 | 79 |
| E | (b) | 5 | 4 | 2.4 | 605 | 2,410 | 735 | 0.2 | 110 | 140 |
| F | (c) | 0 | 1 | 1.2 | 2,555 | 4,555 | 440 | 0.2 | ------ | 1.0 |
| G | (c) | 1 | 1 | 1.2 | 2,055 | 3,875 | 500 | 0.2 | ------ | 1.75 |
| H | (d) | 0 | 1 | 1.2 | 2,460 | 3,070 | 375 | 0.2 | ------ | 0.25 |
| I | (d) | 1 | 1 | 1.2 | 1,705 | 2,020 | 345 | 0.2 | 1.0 | 1.2 |
| J | (e) | 0 | 1 | 1.2 | 1,855 | 2,585 | 395 | 0.2 | 26 | 39 |
| K | (e) | 1 | 1 | 1.2 | 1,500 | 2,630 | 470 | 0.2 | 30 | 81 |
| L | (d) | 0 | 1 | 1.2 | 2,460 | 3,070 | 375 | 0.02 | ------ | 1.38 |
| M | (d) | 1 | 1 | 1.2 | 1,705 | 2,020 | 345 | 0.02 | ------ | 2.5 |
| N | (f) | 0 | 1 | 1.2 | 3,930 | 3,935 | 305 | 0.02 | 12 | 14.6 |
| O | (f) | 1 | 1 | 1.2 | 3,000 | 3,740 | 385 | 0.02 | 18.5 | 19.5 |
| P | (f) | 2 | 1 | 1.2 | 2,330 | 3,385 | 455 | 0.02 | 23.5 | 24.9 |
| Q | (f) | 5 | 1 | 1.2 | 1,570 | 2,750 | 525 | 0.02 | ------ | 62 |
| R | (f) | 5 | 4 | 1.2 | 2,180 | 3,240 | 435 | 0.02 | 28 | 30 |

[1] Cured 40 min. at 307° F. in the following formulation:

```
Rubber------------------------------------------------ Parts
Kosmobile S-66---------------------------------------- 100
Stearic Acid------------------------------------------ 50
Zinc Oxide-------------------------------------------- 1
Sulfur------------------------------------------------ 5
Tuads------------------------------------------------- ----
1,5,9-cyclododecatriene------------------------------- ----
```
(a) Butyl 035.
(b) Butyl 268.
(c) G-RS—1,500.
(d) Smoked Sheet.
(e) Chloro Butyl.
(f) Neoprene.

similar to the first method described above. However, in this method the cyclododecatriene is added before curing to preferred cure systems. Some of the preferred cure systems are as follows: paraquinone dioxime cure, paraquinone dioxime dibenzoate cure, benzothiazyl disulfide cure and a zinc oxide cure.

The rubber, e.g., butyl rubber can be cured either before or after the addition of cyclododecatriene. Any method can be employed as steam, pressure, or mold curing. A particularly satisfactory method is to cure the rubbery polymer in molds at a temperature ranging from 100° C. to 200° C. for a time interval ranging from 5 minutes to 5 hours.

Thus in accordance with the instant invention, it is now possible to provide a rubbery vulcanizate which has a relatively high resistance to ozone. Therefore, this new end product can be used satisfactorily in tire casings, rubber bands and rubber tubing where ozone resistance is the omnipotent characteristic.

The following examples are submitted to illustrate but not to limit this invention:

EXAMPLE I

A rubbery copolymer containing 98% isobutylene with 2% isoprene was compounded as indicated herebelow to provide Rubber A and Rubber B.

| Compound (parts by weight) | A | B |
|---|---|---|
| Copolymer | 100 | 100 |
| Kosmobile S-66 [a] | 50 | 50 |
| Stearic Acid | 1 | 1 |
| Zinc Oxide | 5 | 5 |
| Sulfur | 1 | 5 |
| Tuads [b] | 1.2 | 2.4 |
| 1,5,9-cyclododecatriene | ---- | 5 |

[a] Carbon black (MCP).
[b] Tetramethyl thiuram disulfide.

The above compounding was accomplished by subjecting the copolymer to a mill mixing. All compounding ingredients were added while keeping the mill rolls cool, utes. The physical properties were determined for both vulcanizates therefrom as shown below.

| Vulcanizate | Modulus (300%) (p.s.i.) | Tensile Strength (p.s.i.) | Elongation, percent |
|---|---|---|---|
| A | 870 | 3,165 | 675 |
| B | 605 | 2,410 | 735 |

O₃ EXPOSURE [1]

| Vulcanizate | Minutes to Crack | Minutes to Break |
|---|---|---|
| A | 22 | 31 |
| B | 110 | 140 |

[1] Exposed to ozone (0.2%) at 50% extension (sample 0.2 inch x 0.02 inch).

This example demonstrates that the resistance to ozone is increased 400% by compounded butyl rubber with a cyclic triene such as 1,5,9-cyclododecatriene.

EXAMPLE II

One hundred parts of a rubbery polymer were compounded with 50 parts of Kosmobile S-66, 1 part of stearic acid, 5 parts and various other ingredients to provide vulcanizates C to R therefrom as indicated in Table I. These compounded rubbers were cured in molds at 307° for 40 minutes. The physical properties of each are also shown in Table I.

This example illustrates that the resistance to ozone is improved in butyl rubber, halogenated butyl, neoprene, GR-S and smoked sheet by incorporating a cyclic triene such as 1,5,9-cyclododecatriene therein. It should be noted as the amount of cyclic triene is increased ozone resistance increases but cure rate and physical properties decrease. However the addition of more sulfur and tuads counteracts the slowing effect of the cyclic triene.

Having set forth the general nature and embodiments

What is claimed is:
1. In a process for improving the ozone resistance of a rubbery copolymer of 70 to 99.5 parts by weight of isobutylene with 30 to 0.5 parts by weight of isoprene, the improvement which comprises adding 0.1 to 20 parts by weight of 1,5,9-cyclododecatriene per 100 parts of said copolymer and curing with sulfur at a temperature between 100° and 200° C. for between 1 minute and 5 hours.

2. An improved ozone resistant composition comprising a rubbery copolymer of 70 to 99.5 parts by weight of isobutylene with 30 to 0.5 parts by weight of isoprene and 0.1 to 20 parts by weight of 1,5,9-cyclododecatriene per 100 parts of said copolymer, said composition having been cured with sulfur at a temperature between 100° and 200° C. for between 1 minute and 5 hours.

References Cited in the file of this patent

UNITED STATES PATENTS

| | | |
|---|---|---|
| 2,488,112 | Baldwin | Nov. 15, 1949 |
| 2,884,398 | Thomas et al. | Apr. 28, 1959 |